United States Patent
Groothuis et al.

[15] 3,643,453
[45] Feb. 22, 1972

[54] SELECTIVE CRYSTALLIZATION OF PARAXYLENE IN A WATER-ALKANOL MIXTURE

[72] Inventors: Hendrik Groothuis; Jan G. van de Vusse, both of Amsterdam, Netherlands

[73] Assignee: Shell Oil Company, New York, N.Y.

[22] Filed: Dec. 26, 1968

[21] Appl. No.: 787,063

[52] U.S. Cl..............................................62/58, 260/674 A
[51] Int. Cl..............................................B01d 9/04
[58] Field of Search......................................62/58; 260/674

[56] References Cited

UNITED STATES PATENTS

| | | | |
|---|---|---|---|
| 2,672,487 | 3/1954 | Tegge et l. | 62/58 |
| 2,769,852 | 11/1956 | Paulson | 62/58 |
| 3,285,026 | 11/1966 | Svanoe | 62/58 |
| 3,303,121 | 2/1967 | Li et al. | 62/58 |
| 3,327,492 | 6/1967 | Goard et al. | 62/58 |
| 2,985,694 | 5/1961 | Talbot | 260/674 A |
| 3,410,923 | 11/1968 | Strand et al. | 260/674 A |

Primary Examiner—Norman Yudkoff
Assistant Examiner—R. T. Foster
Attorney—John H. Colvin and E. Walter Mark

[57] ABSTRACT

Selective crystallization of paraxylene from a liquid mixture by direct contact with a cooled, immiscible, liquid refrigerant consisting of alkanol, water and a surface active agent which refrigerant wets the paraxylene crystals preferentially and has a low-interfacial tension relative to the resulting mother liquor.

6 Claims, 1 Drawing Figure

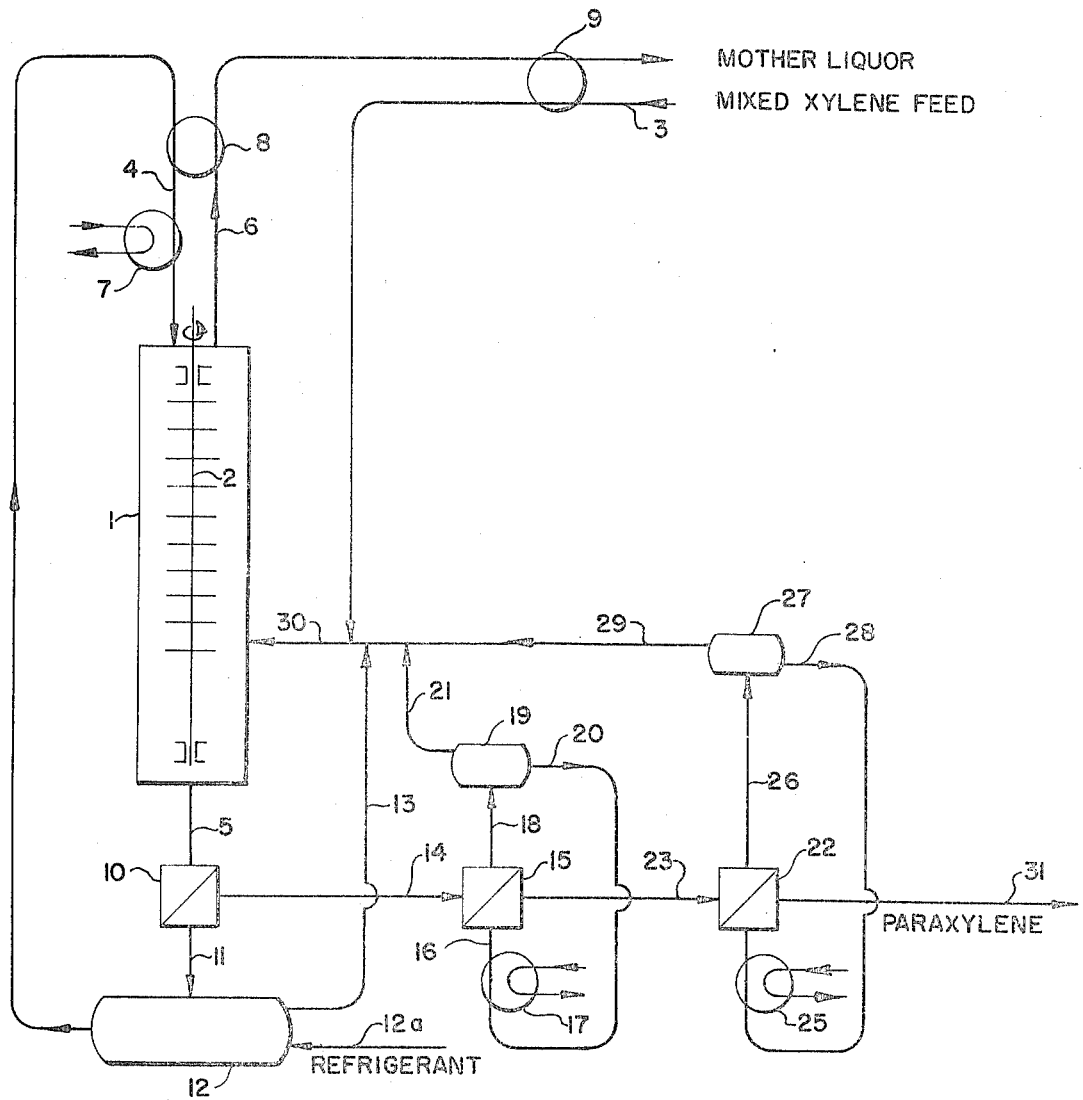

SELECTIVE CRYSTALLIZATION OF PARAXYLENE IN A WATER-ALKANOL MIXTURE

BACKGROUND OF THE INVENTION

This invention relates to a process for the formation and separation of crystalline paraxylene from isomeric aromatic systems. In a preferred application, the invention pertains to the recovery of paraxylene from the products produced by the dehydrocoupling and cycling of lower aliphatic hydrocarbons, or from the xylene-containing mixture obtained as reformate from a reforming operation.

The commercial need for high purity (purity in excess of 99 percent) paraxylene is recognized. This need is based partly on the use of paraxylene as intermediate to methyl terephthalate which is used to prepare polyethylene terephthalate polymers useful as synthetic fibers and films. Another use of high purity paraxylene is in the production of dimethyl terephthalate via oxidation to terephthalic acid and esterification with methanol. The use of higher purity paraxylene starting material results in the production of these derivatives in a purer and more useful state. Even very small amounts of certain impurities affect the color qualities of the polymers which are derived from paraxylene, and often upset the catalyst systems used to make the polymers.

The xylene sources mentioned above ordinarily contain all four $C_8$ aromatic hydrocarbons, i.e., the three-xylene isomers and ethylbenzene. One method of paraxylene separation is fractional crystallization.

A known crystallization process comprises forming crystals of a component by directly contacting a mixture containing the component in a cooling zone, countercurrent to a coiled liquid which is substantially immiscible with the mixture or with the mother liquor. In this process a cooled mass is obtained that consists of a slurry of crystals in the mother liquor. The crystals formed in a process of this type may be very small, for instance about 100 microns. After filtration or centrifugation to separate the crystals a large quantity of mother liquor is still present between the small crystals. When a high purity product is needed, as in the case of paraxylene, the crystals must be further purified. Usually, due to the minute crystal size and the nature of the mother liquor, this further purification requires special, cumbersome, expensive measures. This invention provides a selective crystallization process wherein these disadvantages are obviated to at least a substantial extent.

STATEMENT OF THE INVENTION

It has now been found that high-purity crystalline paraxylene which can be easily further purified is produced by directly contacting a mixture containing paraxylene in a cooling zone, in countercurrent flow, with a suitable cooled, liquid refrigerant that is substantially immiscible with the mixture or with the mother liquor. The suitable cooled liquid employed comprises broadly any solvent which is liquid under the crystallization conditions employed and which wets the crystals preferentially and has a low interfacial tension relative to the remaining mother liquor. Because of the properties of the crystal-wetting refrigerant the crystals are taken up in the liquid refrigerant in the cooling zone, so that a suspension of paraxylene crystals in the liquid refrigerant is formed. The resulting suspension is withdrawn from the cooling zone and the crystals are separated from the liquid refrigerant. The paraxylene crystals form as a result of the decrease in temperature of the mixture and are initially still present in the mother liquor. However, due to the properties with respect to the mother liquor, of the specific liquid refrigerant employed the paraxylene crystals easily enter the liquid refrigerant, forming therewith a separate phase consisting essentially of paraxylene crystals and the liquid refrigerant. Already at that stage the paraxylene crystals are separated from the mother liquor, although a small quantity of mother liquor, apparently adhering to the crystals, may likewise enter the liquid refrigerant phase. But this quantity is substantially smaller than that which remains between the crystals in processes known heretofore. Any further purification of the crystals is greatly facilitated in the process of the invention by the absence of any substantial amount of mother liquor contaminant in the crystal mass.

The process of the invention will be described with reference to the accompanying FIGURE, wherein the sole figure illustrates more or less diagrammatically an elevational view of one form of apparatus suitable for carrying out the invention.

DESCRIPTION OF PREFERRED EMBODIMENTS

Suitable cooling liquids or liquid refrigerants used in the process of the invention comprise broadly the liquids having the above-defined three essential properties. These essential properties or characteristics are (1) that they do not dissolve (i.e., are substantially insoluble with) paraxylene, (2) that they are substantially immiscible with the mother liquor, and (3) that they have an interfacial tension with the mother liquor of less than about 5 dynes/cm. The liquid refrigerant employed may contain a suitable surface-active material. The lower the interfacial tension between the liquid refrigerant and the mother liquor, the more easily the paraxylene crystals will pass into the liquid refrigerant. Under the conditions employed the paraxylene crystals are preferentially wetted by the liquid refrigerant. Preferred liquid refrigerants are those having specific gravities which are intermediate that of the mother liquor and the crystalline product. The density of the refrigerant liquid may be adjusted by dissolving a soluble salt in it, such as $CaCl_2$ in the case of using an alcoholic cooling liquid.

The process of the invention is carried out in any apparatus which permits contacting and countercurrent passage of the liquid hydrocarbon mixture charged and the liquid refrigerant. Paraxylene crystals are formed at the interface between the cooling liquid and the liquid hydrocarbon mixture charged.

In order to promote the wetting of the crystals by the liquid refrigerant it is advisable to provide a cooling zone comprising at least two theoretical mixing stages. The concept "theoretical mixing stage" makes it possible to indicate more precisely the character of the flow through the cooling zone. A zone is said to comprise "n" theoretical mixing stages if the spread of the residence time of the volume of the stream supplied is equal to that of "n" ideal mixers connected in series. In an ideal mixer the composition of its contents is uniform. In the case of two theoretical mixing stages, the spread in residence time of the liquid refrigerant, which is taken to be dispersed phase during the countercurrent contact of the charge with the liquid refrigerant, and of the crystals and the mother liquor in the cooling zone is fairly small, so that each volume element of the contents of the cooling zone is subjected to approximately the same treatment. Under these conditions, crystal growth is promoted. As a result the specific boundary plane of the paraxylene crystals becomes smaller and hence, the quantity of mother liquor that is entrained in the form of a liquid film on the crystals is substantially reduced. Any known procedures available for creating a plurality of mixing stages in the cooling zone may be used. Particularly preferred is the use of a vertically positioned cylindrical reactor in which a substantially axially positioned stirring device which comprises parallel rotating discs is present, as described, for example, in Netherlands Pat. No. 67,392 and in "Chemical Engineering Progress" volume 51 (1955), pages 141-146.

When paraxylene crystals are formed in a mixture of isomeric aromatics, the paraxylene crystals generally have a higher specific gravity than the mother liquor.

It is therefore generally preferred that a liquid refrigerant be used whose specific gravity is higher than that of the mother liquor but lower than that of the crystals.

In a preferred embodiment of the invention, a paraxylene-containing stream comprising mixed $C_8$ aromatics is charged to a vertical-rotary-contactor-type cooling zone at a point below the point at which the liquid refrigerant is added. The liquid refrigerant is preferably introduced by means of one or more nozzles or spargers. The liquid refrigerant is the dispersed phase here, and descends through the mixed aromatics mother liquor. At the surface of the droplets of cold liquid refrigerant paraxylene crystals form. These crystals being heavier than the mother liquor descend together with the droplets of liquid refrigerant. During this descent the crystals enter the droplets of cooling liquid. As the droplets of cooling liquid reach the bottom of the cooling zone they form a continuous layer of liquid which adjoins the mother liquid. Crystals that have not been taken up will reach the interface between liquid refrigerant and mother liquor in the lower part of the cooling zone. Since the liquid refrigerant has a lower specific gravity than the crystals, the crystals will pass through the interfacial boundary into the liquid refrigerant; it being very easy for them to do so, since the interfacial tension between the two liquids is low. Even a small net effect of gravity on the crystals in the mother liquor is sufficient. Mechanical energy, such as generated by stirrers or by rotating discs in the cooling zone, may also contribute to the energy required to cause the crystals to enter the refrigerant. Such mechanical means may be used for the purpose of creating mixing stages in the cooling zone.

Water, or aqueous organic solvents possessing the above-defined essential characteristics, are suitably employed as refrigerants in the process of the invention. A preferred class of refrigerants comprises water to which a freezing point depressant has been added. Suitable freezing point depressants comprise the mono- and polyhydric alkanes particularly the lower alkanols, such as, methanol, ethanol, isopropanol, the butanols, the glycels, such as ethylene glycol, etc. The amount of the freezing point depressant added is controlled to result in an aqueous solution having the essential properties or characteristics defined above. The preferred amount added is dependent to some extent upon the specific operating conditions, such as temperature, employed. Alkanol-water mixtures, for example methanol-water mixtures containing from about 50 to about 75 percent vol. of methanol, have been found satisfactory. Mixtures containing from about 60 to about 70 percent vol. of the alcohol are generally preferred. A mixture consisting of about 65 percent vol. methanol in water enables relatively low temperatures to be used and has a density of about 0.94 g./cm.$^3$ at about $-40°$ C. This is intermediate the density of paraxylene crystals at $-40°$ C. (1.06 g./cm.$^3$) and a typical mother liquor at $-40°$C. (about 0.92 g./cm.$^3$).

In a particularly preferred embodiment of the invention the liquid refrigerant comprises a suitable surface-active agent. Suitable surface-active substances comprise fatty acid soaps, petroleum sulfonates, alkali metal petroleum sulfonates, sulfated alcohols, alkylbenzene sulfonates, long chain alcohol ethoxylates, fatty acid ethoxylates and sulfonates, and the like. Preferred surface-active agents comprise the alkali metal alkylbenzene sulfonates; sodium dodecylbenzene sulfonate being especially preferred.

The amount of surface active agent added may vary within the scope of the invention depending to some extent upon the specific conditions prevailing in the cooling zone. Amounts ranging from about 0.01 to about 3 percent by weight of the refrigerant are suitably used. Generally, about 1 percent or less of surface-active agent is found to be satisfactory. When an alkali metal petroleum sulfonate, for example sodium dodecybenzene sulfonate, is used as the added surface active agent, about 0.03 percent wt. to about 0.15 percent wt. concentrations are preferred.

The liquid refrigerant is introduced into the cooling zone at a temperature below the paraxylene crystallization temperature. Generally, temperatures of from about $-40°$ C. to about $-85°$ C. are used; temperatures from about $-60°$ to about $-80°$ C. being preferred. The resulting suspension of paraxylene crystals in liquid refrigerant leaving the cooling zone is preferably maintained at a temperature which is substantially that at which paraxylene starts to crystallize from the mixture. For a mixture containing about 20 percent wt. paraxylene this temperature is approximately $-40°$ C. Such temperature control makes possible the selective crystallization of a high percentage of the paraxylene present in the mixture of isomeric aromatics charged and the mother liquor will then consist mainly of a mixture of meta- and orthoxylenes.

Since the paraxylene product must be substantially free from the other xylenes, it is very advantageous to have the crystal mass already taken up in the liquid refrigerant. The suspension withdrawn from the cooling zone is filtered or centrifuged. The crystal mass so obtained may be melted and separated from any occluded liquid refrigerant by conventional means, such as decantation. Alternatively the crystals may be further purified if desired as by further washing with fresh liquid refrigerant.

Purification of the paraxylene crystals may be effected by washing at a temperature below the melting point of paraxylene. Preferred washing liquids comprise liquids which have a composition similar to the liquid refrigerant. In this way paraxylene with a purity higher than about 99.0 percent is readily obtained.

Results still more favorable are obtained when the washing of the crystal mass is carried out in a plurality of stages, each stage at a higher temperature than the preceding but always at a temperature below the melting point of paraxylene. As an example: The washing taking place in two stages, at $-40°$ and at 0 C. At $-40$ C. the equilibrium composition of the occluded liquid is about 20 percent para- and about 80 percent meta-/orthoxylene. At about $0°$ C. the equilibrium composition of occluded liquid is about 70 percent para- and about 30 percent meta-/orthoxylene. Now, no more than approximately 2 parts of the liquid to about 92 parts of crystals generally is present around the crystals. Upon melting, paraxylene with a purity of about 99.5 percent is obtained. The yield, based on the amount introduced, is about 92 percent. By increasing the washing temperature any equilibrium liquid present becomes ever richer in paraxylene. The resulting crystal mass can be separated from the washing liquid still present between the crystals by melting the crystals. Then, a layer of molten paraxylene forms above the body of washing liquid and they can be separated by decantation or other phase separation. If the preferred methanol-water mixtures have been used as washing liquid, traces of methanol that may be present in the paraxylene obtained can be removed by washing with water and traces of water can be removed from the paraxylene with a drying agent.

The separation of paraxylene from mixed xylenes by the invention is further described with reference to the Figure of the accompanying drawing.

Vertical chamber 1, defining a contacting zone, is provided with axially positioned stirrer 2 comprising a shaft with a plurality of spaced flat discs (rotary contactor. A liquid mixture comprising mixed xylenes is introduced into chamber 1 via conduits 3 and 30. Refrigerant is introduced via conduit 4. Chamber 1 functions as the cooling zone, in the upper part of which the liquid refrigerant is present as droplets dispersed in organic liquid. In the lower part of the cooling zone a continuous layer of liquid refrigerant is formed in which the paraxylene crystals, formed as a result of the cooling action of the liquid refrigerant, are dispersed. A slurry of refrigerant liquid and paraxylene crystals leaves chamber 1 via conduit 5, and mother liquor leaves chamber 1 via conduit 6. By means of heat exchangers 7 and 8 the liquid refrigerant is brought to the desired low temperature, and the intake mixture of xylenes is cooled by means of heat exchanger 9.

The slurry passes through conduit 5 to filter 10. Liquid from filter 10, mainly consist of liquid refrigerant with a small amount of organic liquid enters phase separator 12 by line 11. The bottom layer of liquid in phase separator 12 consists of liquid refrigerant which is recycled to the cylinder through conduit 4. Additional or makeup refrigerant is supplied via line 12a. The top layer of liquid in phase separator 12 is organic liquid which is combined via conduit 13 with the liquid from conduit 3. The mass of crystals obtained on filter 10 is transferred to filter 15 as indicated by conduit 14 in order to be subjected to a first washing step. The filter 10 may be omitted. The separation of crystal mass from the refrigerant may take place in the bottom part of phase separator 12. Through conduit 16 washing liquid which is brought to the desired temperature by heat exchanger 17 is passed to filter 15. The effluent is passed through conduit 18 to settler 19. Stratified washing liquid is recycled through conduits 20 and 16 and the small amount of separated liquid is passed via conduits 21, 29 and 30 to the contacting zone.

The washed mass of crystals obtained on filter 15 is transferred to filter 22 as indicated by conduit 23 in order to be subjected to a second washing step. Filters 15 and 22 may be replaced by centrifuges. Through conduit 24 washing liquid which is brought to the desired temperature by heat exchanger 25 is passed to filter 22. The temperature of the washing liquid for filter 22 is higher than that for filter 15. The effluent is passed through conduit 26 to settler 27 from which through conduit 28 washing liquid is obtained, and through conduit 29 a small amount of organic liquid which is combined with the liquid streams through conduits 3, 13, and 21, which combined stream is fed into chamber 1 via conduit 30. The washing liquid from 28 is recycled to 24. The final product paraxylene is withdrawn via conduit 31.

EXAMPLE

Paraxylene was separated from a mixture of xylenes utilizing the invention. Apparatus, as diagrammed in the Figure of the attached drawing was used. The internal dimensions of rotary contactor 1 were 200 cm. in length, and 4.3 cm. internal diameter. The discs of stirrer 2 were 1.6 cm. in diameter and were spaced 2.0 cm. apart. The speed of stirrer 2 was 200 r.p.m. The composition of the liquid refrigerant and the washing liquid was 60/40 percent vol. methanol/water containing 0.1 percent wt. of sodium dodecylbenzene sulfonate.

The following table gives ratios of streams through the various conduits based on 100 mass units per time unit for the intake of a mixture of xylenes through conduit 3. This table additionally gives the temperatures and compositions of the various process streams.

|  |  |  |  | Xylenes, mass/time | | |
|---|---|---|---|---|---|---|
|  |  |  |  | Crystals para | Liquid | |
| Conduit | Material | Temperature, °C. | Amount mass/time |  | Para | Meta/ortho |
| 3 | Mixed xylene feed | Ambient | 100 |  | 40 | 60 |
| 6 | Mother liquor | −31 | 83.4 |  | 23.4 | 60 |
| 4 | Refrigerant | −36 | 150 |  |  |  |
| 5 | Crystal slurry | −19 | ¹ 21.2 | 18.2 | 1.2 | 1.8 |
| 11 | Filter effluent | −19 | ¹ 1.5 |  | 0.6 | 0.9 |
| 14 | Crystal mass | −19 | 19.7 | 18.2 | 0.6 | 0.9 |
| 13 | Mother liquor | −19 | 1.5 |  | 0.6 | 0.9 |
| 16 | Washing liquid | −19 | 100 |  |  |  |
| 23 | Crystal mass | −19 | 18.5 | 18.2 | 0.1 | 0.2 |
| 18 | Filter effluent | −19 | ² 1.2 |  | 0.5 | 0.7 |
| 20 | Washing liquid | −19 | ca. 100 |  |  |  |
| 21 | Mother liquor | −19 | 1.2 |  | 0.5 | 0.7 |
| 24 | Washing liquid | +9 | 100 |  |  |  |
| 26 | Filter effluent | +9 | ³ 1.9 |  | 1.7 | 0.2 |
| 28 | Washing liquid | +9 | ca. 100 |  |  |  |
| 29 | Mother liquor | +9 | 1.9 |  | 1.7 | 0.2 |
| 30 | Intake cylinder | −19 | 104.6 |  | 42.8 | 61.8 |
| 31 | Crystal mass | +9 | 16.6 | 16.3 | 0.27 | 0.03 |

¹ About 150 (cooling liquid).
² About 100 (washing liquid).

The final product, obtained after melting the last mentioned crystal mass is paraxylene with a purity of 99.8 percent. The yield based on paraxylene present in the intake mixture amounts to 71 percent. This yield will increase when the temperature of the cooling liquid is lower.

We claim as our invention:

1. In a process for separating paraxylene from a homogeneous, normally liquid mixture of paraxylene and closely boiling homologs, wherein the liquid mixture is chilled to below the crystallization temperature of paraxylene to crystallize substantially only paraxylene by directly contacting the liquid mixture in a cooling zone, in countercurrent, with a liquid refrigerant that is substantially immiscible with the liquid mixture or with the resulting mother liquor, the improvement which comprises:

a. conducting said contacting in a single cooling zone having a plurality of mixing stages;
   b. employing a liquid refrigerant which preferentially wets the crystals of paraxylene and which consists of
      i. alkanol-water mixtures containing from about 60 to about 70 percent by volume alkanol, and
      ii. from about 0.01 to about 3 percent be weight, based on the weight of liquid refrigerant, of an alkali metal alkylbenzene sulfonate surface active agent;
   c. crystallizing paraxylene at the refrigerant-liquid mixture interface;
   d. forming a suspension of paraxylene crystals dispersed in the liquid refrigerant, which suspension contains only small amounts of entrained mother liquor, by passage of the crystals across the refrigerant-mother liquor interface;
   e. removing from the cooling zone, as separate streams, a paraxylene-depleted mother liquor and the suspension of paraxylene crystals dispersed in liquid refrigerant; and
   f. recovering paraxylene crystals having a purity in excess of 99 percent from the crystal-refrigerant suspension.

2. The process according to claim 1, which process employs a liquid refrigerant whose specific gravity is higher than that of the mother liquor but lower than that of the paraxylene crystals, this refrigerant in the bottom part of the cooling zone forming a continuous layer of liquid which adjoins the mother liquor.

3. The process according to claim 2 wherein the liquid refrigerant consists of a methanol-water mixture containing from about 60 to about 70 percent v methanol and from about 0.03 to about 0.15 percent w sodium dodecylbenzene sulfonate.

4. The process according to claim 3, wherein the suspension after leaving the cooling zone is filtered or centrifuged, whereupon the crystal mass is washed, at a temperature below the melting point of paraxylene, with a liquid that is substantially immiscible with paraxylene which liquid wets the crystals preferentially and has an interfacial tension of less than about 5 dyne/cm. relative to the mother liquor.

5. The process according to claim 4, wherein the washing liquid has substantially the same composition as the liquid refrigerant and the washing is carried out in at least two stages, each time at a higher temperature but always at a temperature below the melting point of paraxylene.

6. In a process for separating paraxylene from a homogeneous, normally liquid mixture of paraxylene and closely boiling homologs, wherein the liquid mixture is chilled to below the crystallization temperature of paraxylene to crystallize substantially only paraxylene by directly contacting the liquid mixture in a cooling zone, in countercurrent, with a liquid refrigerant that is substantially immiscible with the liquid mixture or with the resulting mother liquor, the improvement which comprises:

a. conducting said contacting in a single cooling zone having a plurality of mixing stages;
b. employing a liquid refrigerant which preferentially wets the crystals of paraxylene and which consists of
   i. alkanol-water mixtures containing from about 60 to about 70 percent by volume alkanol, and
   ii. from about 0.01 to about 3 percent by weight, based on the weight of liquid refrigerant, of a surface active agent selected from the group consisting of fatty acid soaps, petroleum sulfonates, alkali metal alkylbenzene sulfonates, sulfated alcohols, alkylbenzene sulfonates, long chain alcohol ethoxylates, fatty acid ethoxylates, and fatty acid sulfonates;
c. crystallizing paraxylene at the refrigerant-liquor mixture interface;
d. forming a suspension of paraxylene crystals dispersed in the liquid refrigerant, which suspension contains only small amounts of entrained mother liquor, by passage of the crystals across the refrigerant-mother liquor interface;
e. removing from the cooling zone, as separate streams, a paraxylene-depleted mother liquor and the suspension of paraxylene crystals dispersed in liquid refrigerant; and
f. recovering paraxylene crystals having a purity in excess of 99 percent from the crystal-refrigerant suspension.

* * * * *